United States Patent [19]

Satoh et al.

[11] Patent Number: 4,847,717

[45] Date of Patent: Jul. 11, 1989

[54] HANDLING OF A TAPE CASSETTE

[75] Inventors: Takateru Satoh; Haruo Shiba; Masaru Ikebe, all of Nagano, Japan

[73] Assignee: TDK Corporation, Japan

[21] Appl. No.: 58,839

[22] Filed: Jun. 5, 1987

[30] Foreign Application Priority Data

Jun. 10, 1986 [JP] Japan .............................. 61-87212[U]

[51] Int. Cl.$^4$ ............................................. G11B 23/02
[52] U.S. Cl. ..................................... 360/132; 242/199
[58] Field of Search .................. 360/132, 93; 242/197, 242/199, 198; 206/387

[56] References Cited

U.S. PATENT DOCUMENTS

| 4,155,514 | 5/1979 | Smith, II | 242/194 X |
| 4,401,220 | 8/1983 | Kim | 206/387 |
| 4,497,008 | 1/1985 | Schoenmakers | 360/132 |
| 4,572,461 | 2/1986 | Horikawa et al. | 360/132 X |
| 4,646,190 | 2/1987 | Meguro | 360/132 |
| 4,660,784 | 4/1987 | Sumida et al. | 360/132 X |

Primary Examiner—Robert S. Tupper
Assistant Examiner—Andrew L. Sniezek
Attorney, Agent, or Firm—Steinberg & Raskin

[57] ABSTRACT

A casing for a magnetic tape cassette capable of effectively and precisely actuating a slider. The casing includes a casing body having an upper casing member and a lower casing member joined together. The slider is slidably mounted on the lower casing member so as to cover at least a part of a bottom and a side of the lower casing member. The upper casing member is provided at a rear portion of both sides thereof with holding members through which the casing is grasped. The holding members are separated or isolated from the slider, to assure smooth sliding movement of the slider. The casing body may be provided on both sides thereof with reliefs which serve to prevent the holding members from interfering with movement of the slider.

10 Claims, 5 Drawing Sheets

HANDLING OF A TAPE CASSETTE

BACKGROUND OF THE INVENTION

The present invention relates to a casing for a magnetic tape cassette, and more particularly to a casing for a magnetic tape cassette which is conveniently used to record a digital signal, such as a PCM signal for example.

PCM recording and reproducing apparatus have recently been proposed which are adapted to convert an analog signal such as an acoustic signal or the like into a digital signal such as a PCM signal for example, and then record the digital signal on a magnetic tape element for reproducing the same. One such conventional PCM recording and reproducing apparatus is generally constructed to utilize a rotary head for carrying out recording on a magnetic tape element at relatively high density. More particularly, the recording and reproducing apparatus is adapted to draw out a magnetic tape element from a casing and wind up the same on a rotating drum which is provided with the rotary head, during the recording or reproducing operation.

When a fingerprint, dust, or the like adheres to a magnetic tape element, a drop out is likely to be caused or occur in a reproducing signal of a magnetic tape cassette used in such a PCM recording and reproducing apparatus. In order to avoid such a problem, it is necessary to keep the magnetic tape element in a casing as much as possible, in order to protect the same. Also, in order to assure smooth drawing-out of the tape element from the casing during recording or reproducing, it is necessary to provide the casing with a space through which guide means of the apparatus are able to be inserted into the cassette casing.

In order to meet such requirements, a casing for a magnetic tape cassette has been proposed which is generally constructed in a manner such as illustrated in FIGS. 1 and 2. More particularly, the casing generally designated by reference numeral 100 includes an upper casing member 102 and a lower casing member 104 joined together to define a space therein for housing a magnetic tape element. The casing also includes a slider 106 arranged outside of the lower casing member 104 as illustrated. The slider 106 is formed with a sufficient shape to cover a bottom and a part of each of both sides of the lower casing member 104, and is slidably received at each of both sides thereof in a recess 108 in the lower casing member 104, so as to be flush with an outer surface of the upper cover member 102.

The slider 106 is adapted to be slidably reciprocated along the outer surface of the lower casing member 104 in the recess 108 in a direction of the casing sides. The casing 100 is also provided at a front wall thereof with an opening which is selectively closed by a front cover 110. The front cover 110 is pivotally mounted at a front portion of the casing, so that the front cover 110 may be actuated due to sliding movement of the slider 106, to selectively cover the front opening of the casing 100.

When the casing 100 constructed as described above as illustrated in FIGS. 1 and 2 and in which a magnetic tape element has been arranged to form a magnetic tape cassette, is inserted in a recording and reproducing apparatus, the slider 106 is moved in a rearward direction of the casing 100 to pivotally move the front cover 110 to expose the front opening of the cassette casing. Thus, the magnetic tape element may be exposed through the front opening of the casing 100. During non-use of the magnetic tape cassette, the slider 106 is positioned at a forward position to cause the front cover 110 to close or cover the front opening of the casing 100, to sealingly maintain the magnetic tape element within the casing 100.

When the casing 100 is to be inserted in the recording and reproducing apparatus, an operator generally grasps the recess 108 or a portion of the casing 100 adjacent thereto. This hinders smooth sliding of the slider 106, leading to failure of smooth insertion of the magnetic tape cassette in the apparatus. Also, when the magnetic tape cassette is removed from the recording and reproducing apparatus, the slider 106 is left at its retracted or backward position, depending upon the apparatus, so that it is necessary for an operator to manually move the slider to its forward position to close the opening of the casing.

This is generally carried out in a manner by the operator grasping a portion of the casing 100 at which the retracted slider is positioned, to remove the magnetic tape cassette from the apparatus. Accordingly, the tape is removed while leaving the slider at the retracted or backward position, so that the front opening of the casing 100 is left open. This causes adhesion of dust, fingerprinting, or the like on the magnetic tape element, resulting in a drop out in a signal stored on the tape element.

Accordingly, it would be highly desirable to develop a casing for magnetic tape cassette which is capable of constantly assuring smooth actuation of a slider and permitting an operator to carry out charging and withdrawing of the magnetic tape cassette with respect to recording and reproducing apparatus without directly contacting the slider.

SUMMARY OF THE INVENTION

Accordingly, it is an object of the present invention to provide a casing for a magnetic tape cassette which is capable of permitting a magnetic tape element to constantly exhibit normal functioning for a long period of time.

It is another object of the present invention to provide a casing for a magnetic tape cassette which is capable of accomplishing stable and positive actuation of a slider.

It is a further object of the present invention to provide a casing for a magnetic tape cassette which is capable of permitting the charging and withdrawing of the magnetic tape cassette with respect to recording and reproducing apparatus, without contacting a slider thereon.

Other objects and advantages of the present invention will become apparent from the following description of the present invention.

These and other objects are attained by the present invention which is directed to a tape cassette casing comprising a frame having sidewalls and a top wall and a bottom wall. A slider is slidably mounted upon the frame to be slidable in a direction of the sidewalls and is arranged to cover at least a portion of the bottom wall and the sidewalls of the frame. Means for grasping the cassette are provided upon the frame, while means for positioning the grasping means and the slider apart from one another are also provided, so that the sliding movement of the slider remains unhindered. The positioning means may position the grasping means out of a sliding path of the slider itself.

Briefly speaking, in accordance with the present invention, a casing for a magnetic tape cassette is provided. The casing includes a casing body or frame which comprises an upper casing member and a lower casing member joined together to define a space therein for housing a magnetic tape element. The casing also includes a slider which is slidably mounted on the casing body or frame so as to be slidable in a lateral direction of the casing body or frame, and is arranged so as to cover at least a part of a bottom and both sides of the lower casing member. The upper casing member is provided, at a rear portion of each of both sides thereof, with grasping or holding means which are isolated or apart from the slider, so as not to hinder sliding movement of the slider, and through which the casing is grasped. The casing body may be provided at each of both sides thereof with a relief which prevents the holding or grasping means from interfering with sliding movement of the slider when the same is slided.

BRIEF DESCRIPTION OF THE DRAWINGS

For a fuller understanding of the present invention, reference is made to the following description taken in conjunction with the accompanying drawings in which like reference numerals designate like or similar parts throughout, and in which.

DESCRIPTION OF THE PREFERRED EMBODIMENTS

A casing for a magnetic tape cassette according to the present invention will be described below with reference to FIGS. 3-8.

Figure 1:
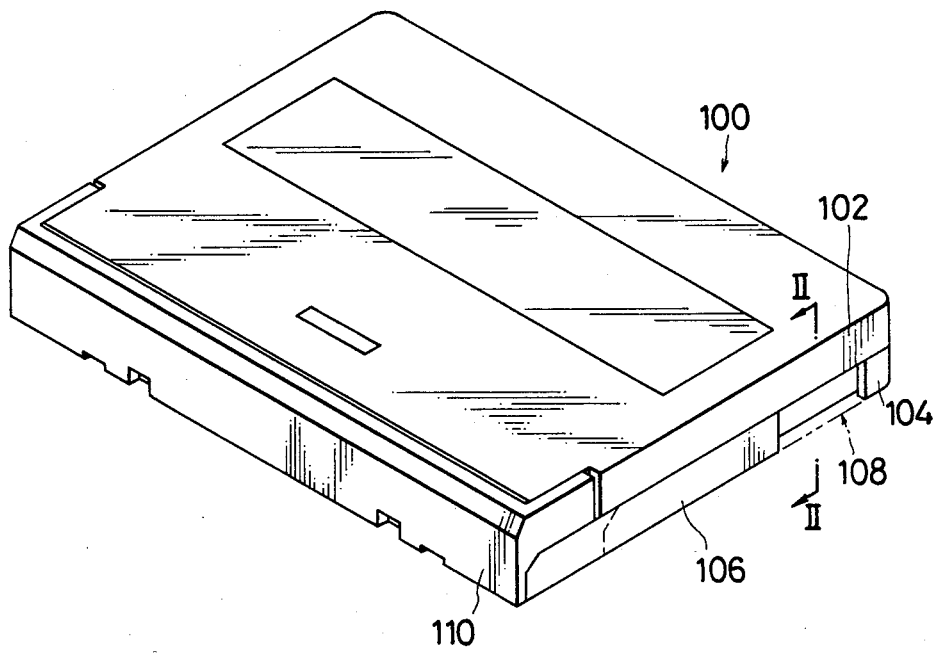
FIG. 1 is a perspective view illustrating a conventional casing for a magnetic tape cassette.
Figure 2:
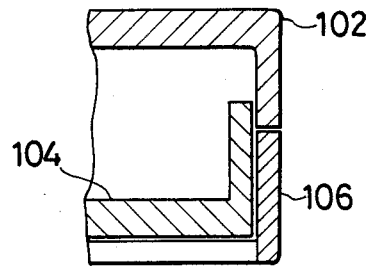
FIG. 2 is a fragmentary sectional view taken along line II—II of FIG. 1.
Figure 3:
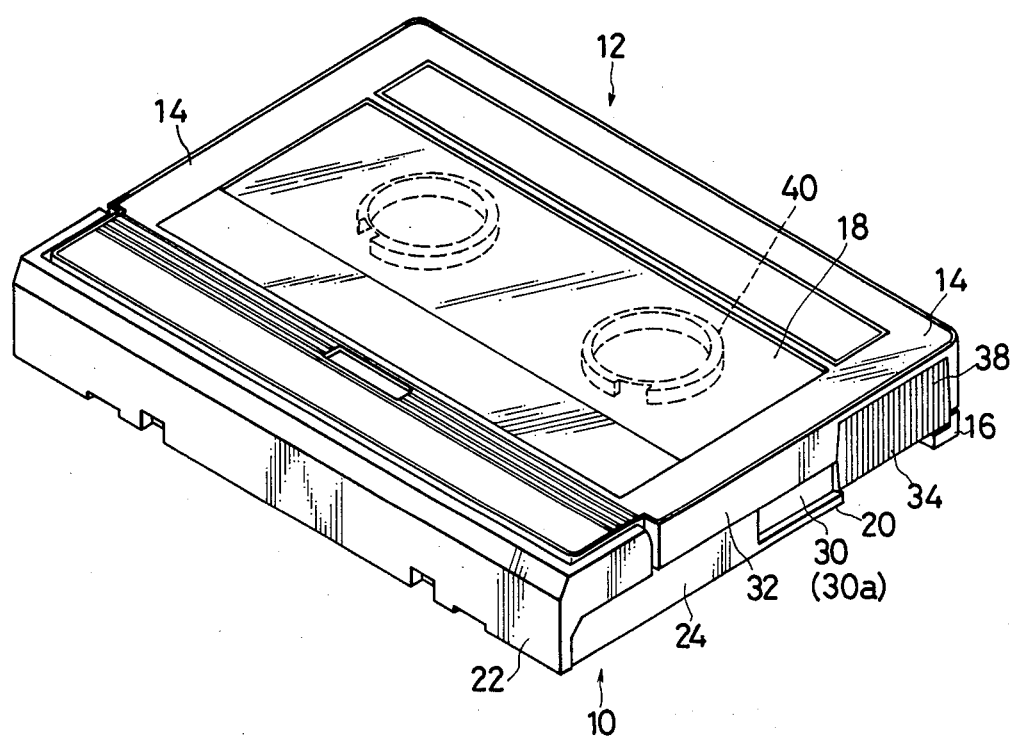
FIG. 3 is a perspective view generally illustrating an embodiment of a casing for a magnetic tape cassette according to the present invention.
Figure 4:
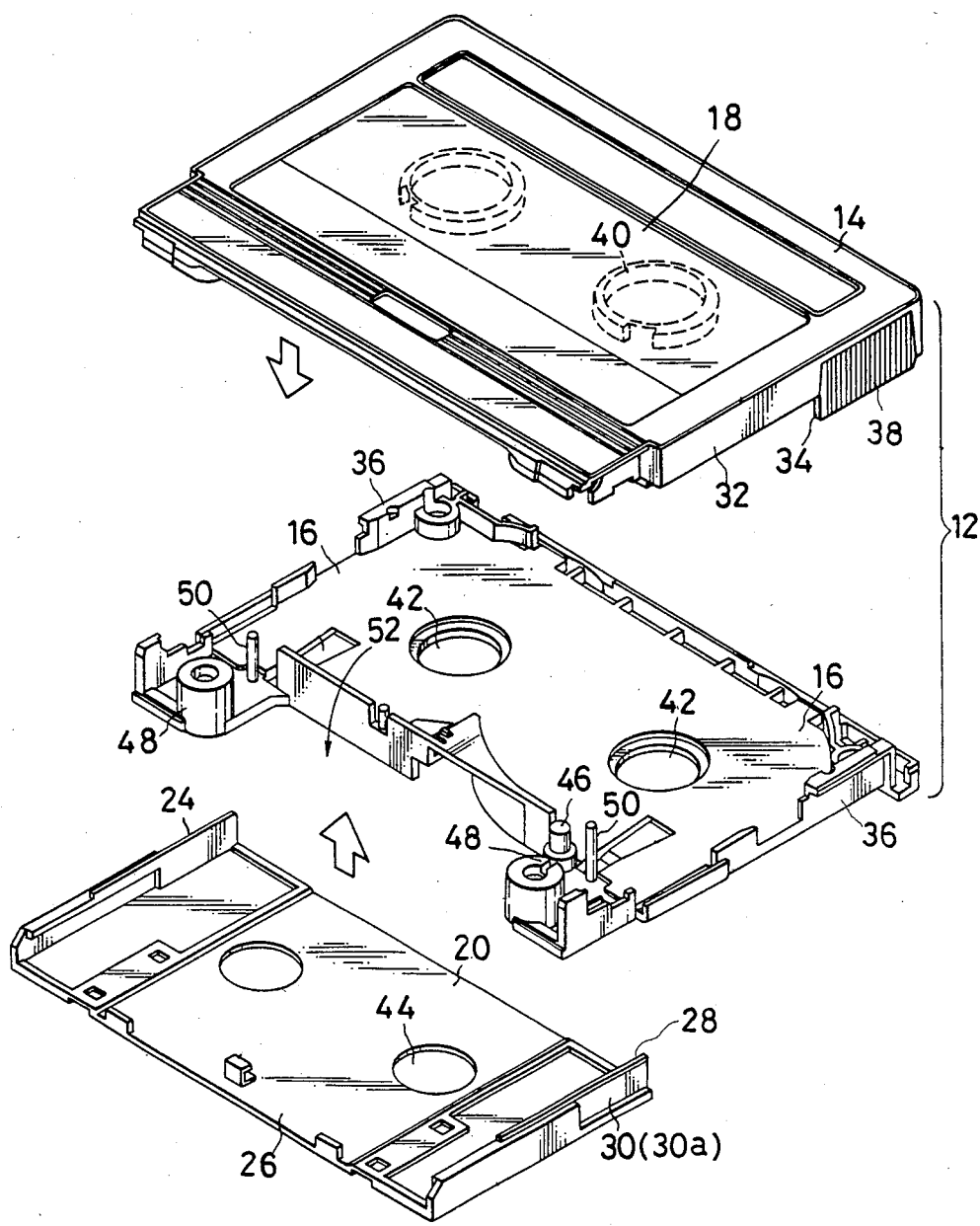
FIG. 4 is an exploded perspective view of the casing illustrated in FIG. 3.

FIGS. 3 and 4 illustrate an embodiment of a casing for a magnetic tape cassette according to the present invention, which is generally designated by reference numeral 10 in the illustrated embodiment, and which includes a casing body 12 comprising an upper casing member 14 and a lower casing member 16 integrally joined together by means of screws to define a space therewithin. The terms "upper" and "lower" as used herein, are merely relative to one another. In other words, the casing 10 illustrated in FIG. 3 may be conveniently inverted so that the upper casing member 14 becomes the "lower" member, while the lower member 16 thereby becomes the "upper" member.

In the so-formed casing body 12, a pair of reel hubs (not illustrated) are rotatably housed, on which a magnetic tape element (not illustrated) is movably wound. The upper casing member 14 is provided with a transparent window 18 through which the magnetic tape element received in the casing 10 can be observed.

The lower casing member 16 is provided with a slider 20, which is slidably mounted on the lower casing member 14 so as to be movable in a lateral direction of the cassette casing 10. The slider 20 may be operatively connected to a front cover 22 pivotally mounted at a front portion of the upper casing member 14 to open and close a front opening of the casing body 12. The connection between the slider 20 and the front cover 22 may be effected in a manner that is widely known in the art. In the illustrated embodiment, the slider 20 is formed into a substantially U-shape so as to cover a bottom wall of the lower casing member 16 and a part of each of both sidewalls 36, 36 thereof. More particularly, the slider 20 as illustrated in FIG. 4, is formed to have two vertical walls 24, and a bottom wall 26 interposed between the vertical walls 24.

Figure 5A:
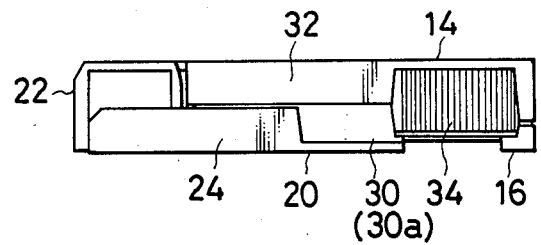
FIGS. 5A and 5B are each side elevational views of the casing illustrated in FIG. 3, with FIG. 5A illustrating the state where a slider is positioned at a forward location, and FIG. 5B illustrating a state where the slider has been moved to a rearward position.
Figure 5B:
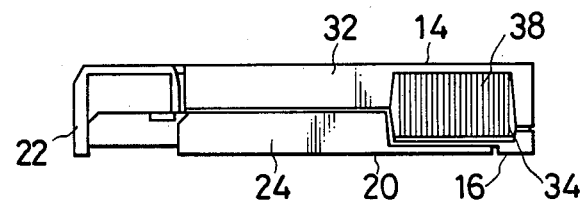

The casing 10 of the illustrated embodiment further includes reliefs 30 provided in at least one of the casing body 12 and the slider 20. In the illustrated embodiment, the reliefs 30 are each provided on each of the vertical walls 24 of the slider 20. Correspondingly, the upper casing member 14 is provided at a rear portion of each of both side walls 32 thereof, with holding means or holders 34 which are positioned in the relief 30 when the slider 20 is at a rearward or retracted position, as illustrated in FIG. 5B. In this embodiment, the holding means 34 comprise an extension formed by downwardly extending the rear portion of each of both side walls 32 of the upper casing member 14. Alternatively, the holding means 34 may comprise a plate-like projection provided at the rear portion of each of both sides 32 of the upper casing member 14, so as to downwardly extend therefrom.

Thus it is noted that in the illustrated embodiment, the holding means or holders 34 are each isolated from the slider 20 through the relief 30, so as to be prevented from interfering with movement of the slider 20. For this purpose, each of the reliefs 30 provided on the slider 20 is formed to have a sufficient shape and size to prevent the holding means 34 from interfering with the slider 20 between a forward position of the slider illustrated in FIG. 5A, and a rearward position thereof illustrated in FIG. 5B, thus ensuring smooth movement of the slider when it is slided in the longitudinal direction of the casing body or frame 12.

The relief 30 may comprise a recess or indentation 30a formed on the slider 20 by partially removing an outer surface of a rear portion 28 of each of the vertical walls 24 of the slider 20, as illustrated in FIG. 4. In this instance, the slider 20 may be slided while contacting a surface of the recess 30a with an inner surface of the holding or grasping means 34. For this purpose, the surface of the recess 30a contacting the holding or grasping means 34, may be formed with lubricating characteristics.

Figure 6:
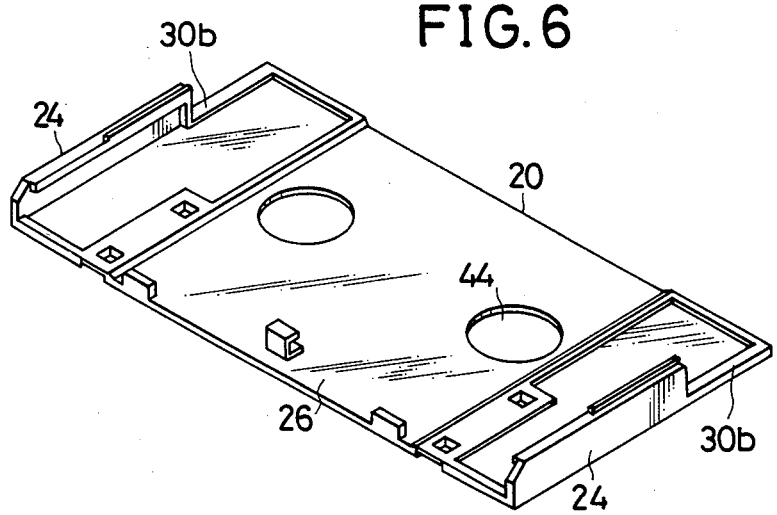
FIG. 6 is a perspective view illustrating an essential part of the casing illustrated in FIG. 3.

Alternatively, the relief 30 may comprise a through-opening or cutout 30b formed at the rear portion 28 of each vertical wall 24 of the slider 20, as illustrated in FIG. 6. In this case, both side walls 36 of the lower casing member 16 are each preferably formed to have a sufficient length to fill up or cover a vacancy defined by the cutout 30b when slider 20 is moved to a forward position such as illustrated in FIG. 5A.

In the illustrated embodiment, the relief 30 as described above is provided in or on the slider 20. However, the relief 30 may be provided in or on the casing body or frame 12 in the present invention. More particularly, the casing may be constructed in a manner such that the upper casing member 14 is formed with a cutout in each of both side walls 32 thereof, serving as the relief 30, and in which the side wall 24 of the slider 20 is slidably fitted. Alternatively, the casing 10 may be constructed so that a gap is formed between the upper casing member 14 and the lower casing member 16 so as to serve as the relief 30, and in which the side wall 24 of the slider 20 is slidably fitted.

The holding means or holders 34 are preferably formed on surfaces thereof with knurls 38 acting as antislipping means.

In the drawings, reference numeral 40 designates hub regulating ribs each provided on the upper casing member 14 for supporting a reel hub, while reference numerals 42 and 44 respectively designate holes in the lower casing member 16 and holes in the slider 20 through which shafts of the reel are inserted. Reference numeral 46 designates a portion of the lower casing member 16 on which a tape guide roller is mounted, while reference numeral 48 denotes projections for holding screws, with reference numeral 50 indicating guide pins and reference numeral 52 an opening formed at a front portion of the lower casing member 16, which is adapted to be closed by the slider 20.

Figure 7:
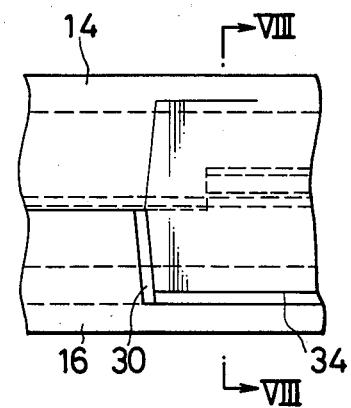
FIG. 7 an enlarged, fragmentary, side elevational view of a part of the modification illustrated in FIG. 5B.
Figure 8:
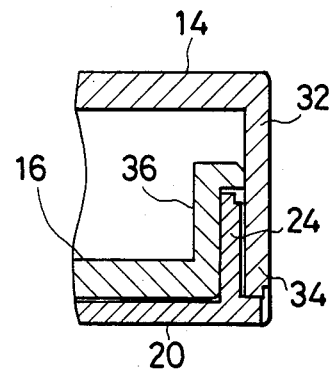
FIG. 8 a fragmentary sectional view taken along line VIII—VIII of FIG. 7.

In the casing 10 of the illustrated embodiment constructed as described above, both the slider 20 and front cover 22 are positioned to close the opening of the casing body 12 during non-use of the magnetic tape cassette, to sealingly keep the magnetic tape element within the casing. Thus, the tape element may be safely housed within the casing 10, as illustrated in FIG. 5A. When the magnetic tape cassette is charged or inserted into recording and reproducing apparatus, the slider 20 is moved from the forward position illustrated in FIG. 5A to the rearward position illustrated in FIG. 5B, to open the opening of the casing body 12 due to pivotal movement of the front cover 22, as illustrated in FIGS. 5 and 7. In this instance, the movement of the slider 20 is smoothly carried out irrespective of the holding means 34, because of the relief 30.

As can be seen from the foregoing, the casing of the present invention is so constructed that the slider 26 is slided in the lateral direction of the casing body 12 sidewalls 32, 36 without being hindered by the holding means or holders 34 provided on each of the side walls 32 of the upper casing member 14. Accordingly, the casing 12 ensures stable and smooth actuation of the slider 26. Also, charging/inserting and withdrawing of the magnetic tape cassette with respect to recording and reproducing apparatus, are carried out by grasping the holding or grasping means 34, and without an operator directly contacting the slider 26, resulting in smooth movement of the slider 26 during operation in accordance with the present invention. It is thus seen that the objects set forth above, in addition to those apparent from the preceding description, are efficiently attained.

Changes may be made in the above construction without departing from the spirit and scope of the present invention. The above description and accompanying drawings are intended to be merely illustrative, and not intended to be limiting in any way.

We claim:

1. A tape cassette, comprising
a frame having a pair of said walls, a top wall and a bottom wall, and a front end and a rear end extending between said side-walls and said top and bottom walls, which define a space therewithin in which a tape is movably wound,
a slider slidably mounted upon said frame to be slidable in a direction of said frame sidewalls and arranged to cover at least a portion of said bottom wall and sidewalls of said frame and to cover or uncover an opening at a front portion of said bottom wall toward said front end, depending upon sliding movement thereof,
means for grasping said cassette provided upon said frame, and
means for positioning said grasping means and said slider apart from one another, with the sliding movement of said slider remaining unhindered,
wherein said grasping means are provided on outer surfaces of both said sidewalls at rear positions thereof toward said rear end and extend substantially in a thickness direction of said casing between said top and bottom walls,
said positioning means comprises a pair of through-openings or cut-outs provided in said slider, each said through-opening or cut-out provided in a location of said slider towards said casing rear end, each said through-hole or cut-out having dimensions sufficient to prevent said grasping means from hindering the sliding movement of said slider, and
said grasping means having sufficient thickness between said top and bottom walls and length between said front and rear ends to substantially cover a vacancy defined by each said through-opening or cut-out when said slider is moved to a retracted position towards said casing rear end.

2. The casing of claim 1, wherein
said frame comprises two members, an upper member comprising a pair of sidewalls and said top wall, and a lower member comprising a pair of sidewalls and said bottom wall,
said upper and lower casing members being joined together with the respective sidewalls thereof forming the sidewalls of said frame,
said slider being arranged to cover at least a part of said sidewalls of said lower casing member, and
said grasping means being provided on both sidewalls of said upper casing member at the rear positions thereof toward said rear end and extending downwardly toward said bottom wall by a greater distance than thickness of said upper casing sidewalls.

3. The casing of claim 2, wherein said side-walls of said lower casing member at least partially covered by said slider, are each formed of sufficient length to cover a vacancy defined by said cutouts when said slider is moved to a forward position toward said forward end.

4. The casing of claim 1, wherein said grasping means comprise downwardly-projecting extensions of said upper casing sidewalls at the rear location of said upper casing.

5. The casing of claim 2, wherein said grasping means comprise downwardly extending plate-like projections from said upper casing sidewalls at the rear location of said upper casing.

6. The casing of claim 1, additionally comprising antislipping means formed on a surface of said grasping means for preventing slipping upon grasping of said cassette.

7. The casing of claim 6, wherein said antislipping means comprise a series of knurls.

8. The casing of claim 1, additionally comprising
a cover pivotally mounted upon said front end of said casing and arranged to cover or uncover said front end of said casing and thereby respectively shield or expose a run of the tape along the front end of the casing.

9. The casing of claim 8, wherein the tape is movably wound about two reel hubs.

10. The casing of claim 1, wherein said frame comprising two members, an upper member comprising a pair of sidewalls and said top wall, and a lower member comprising a pair of sidewalls and said bottom wall;
said upper and lower casing members being joined together with the respective side walls thereof forming the sidewalls of said frame,
said slider being arranged to cover at least a part of said sidewalls of said lower casing member, and
said grasping means provided on both sidewalls of said upper casing member at the rear location thereof towards said rear end and extending downwardly towards said bottom wall.

* * * * *